(12) United States Patent
Galula et al.

(10) Patent No.: US 12,139,169 B2
(45) Date of Patent: Nov. 12, 2024

(54) SYSTEM AND METHOD FOR DETECTING EXPLOITATION OF A COMPONENT CONNECTED TO AN IN-VEHICLE NETWORK

(71) Applicant: Argus Cyber Security Ltd, Tel Aviv (IL)

(72) Inventors: Yaron Galula, Kadima (IL); Nizzan Kruvi, Tel-Aviv (IL)

(73) Assignee: Argus Cyber Security Ltd, Tel Aviv (IL)

( * ) Notice: Subject to any disclaimer, the term of this patent is extended or adjusted under 35 U.S.C. 154(b) by 0 days.

(21) Appl. No.: 16/637,770

(22) PCT Filed: Aug. 9, 2018

(86) PCT No.: PCT/IL2018/050888
§ 371 (c)(1),
(2) Date: Feb. 10, 2020

(87) PCT Pub. No.: WO2019/030763
PCT Pub. Date: Feb. 14, 2019

(65) Prior Publication Data
US 2020/0216097 A1 Jul. 9, 2020

Related U.S. Application Data

(60) Provisional application No. 62/543,397, filed on Aug. 10, 2017.

(51) Int. Cl.
*B60W 60/00* (2020.01)
*G08G 1/00* (2006.01)
(Continued)

(52) U.S. Cl.
CPC ......... *B60W 60/00188* (2020.02); *G08G 1/20* (2013.01); *H04W 12/009* (2019.01);
(Continued)

(58) Field of Classification Search
CPC .. B60W 60/00188; G06F 21/51; G06F 21/52; G06F 21/552; G06F 21/554; G08G 1/20;
(Continued)

(56) References Cited

U.S. PATENT DOCUMENTS 8,868,030 B2 * 10/2014 Sumcad ............. H04W 12/121
455/405
9,378,455 B2 * 6/2016 Yufik ..................... G06N 3/063
(Continued)

FOREIGN PATENT DOCUMENTS

JP 2006-107182 4/2006
JP 2006-119754 5/2006
(Continued)

OTHER PUBLICATIONS

U. E. Larson, D. K. Nilsson and E. Jonsson, "An approach to specification-based attack detection for in-vehicle networks," 2008 IEEE Intelligent Vehicles Symposium, Eindhoven, Netherlands, 2008, pp. 220-225, doi: 10.1109/IVS.2008.4621263. (Year: 2008).*
(Continued)

*Primary Examiner* — Jonathan L Sample
(74) *Attorney, Agent, or Firm* — PEARL COHEN ZEDEK LATZER BARATZ LLP

(57) ABSTRACT

A system and method for detecting cyber threats in a vehicle may detecting an event related to exploitation of a component connected to an in-vehicle network based on a deviation of execution of executable code from a reference execution behavior. A deviation may be detected based on a set of whitelists and blacklists. An event related to a deviation may be recorded.

20 Claims, 5 Drawing Sheets

(51) Int. Cl.
   *H04W 12/00* (2021.01)
   *H04W 12/50* (2021.01)
   *H04W 12/67* (2021.01)
   *H04L 9/06* (2006.01)

(52) U.S. Cl.
   CPC ............ *H04W 12/50* (2021.01); *H04W 12/67* (2021.01); *H04L 9/0643* (2013.01)

(58) Field of Classification Search
   CPC .. H04L 9/0643; H04W 12/009; H04W 12/50; H04W 12/67
   USPC .......................................................... 701/1
   See application file for complete search history.

(56) References Cited

U.S. PATENT DOCUMENTS

| | | | |
|---|---|---|---|
| 9,635,016 B2* | 4/2017 | Liu | H04L 63/083 |
| 9,923,722 B2* | 3/2018 | Nanjundappa | G07C 5/008 |
| 10,057,286 B2* | 8/2018 | Ben David | H04L 63/145 |
| 10,142,358 B1* | 11/2018 | Bajpai | H04L 1/201 |
| 10,193,903 B1* | 1/2019 | Bajpai | H04L 63/1425 |
| 10,200,259 B1* | 2/2019 | Pukish | H04L 69/326 |
| 10,204,219 B2* | 2/2019 | Harel | G06F 21/51 |
| 10,230,522 B1* | 3/2019 | Roths | H04L 67/12 |
| 10,298,612 B2* | 5/2019 | Galula | H04L 67/12 |
| 10,369,942 B2* | 8/2019 | Ben Noon | G06F 21/606 |
| 10,530,793 B2* | 1/2020 | Galula | H04L 63/1425 |
| 10,728,265 B2* | 7/2020 | Hayden | H04L 63/1425 |
| 11,074,497 B2* | 7/2021 | Ascari | G06N 7/01 |
| 11,487,811 B2* | 11/2022 | Das | G06F 18/24143 |
| 11,985,150 B2* | 5/2024 | Bajpai | H04L 67/34 |
| 2004/0230803 A1* | 11/2004 | Kuhls | G06F 21/572 |
| | | | 713/176 |
| 2006/0150256 A1* | 7/2006 | Fanton | H04L 63/10 |
| | | | 726/27 |
| 2008/0232595 A1* | 9/2008 | Pietrowicz | H04L 9/3297 |
| | | | 380/277 |
| 2008/0282345 A1* | 11/2008 | Beals | G06F 21/71 |
| | | | 726/21 |
| 2012/0127928 A1* | 5/2012 | Ichihara | H04L 12/6418 |
| | | | 370/328 |
| 2012/0185125 A1* | 7/2012 | Kitagawa | G07C 5/085 |
| | | | 701/32.7 |
| 2013/0081106 A1* | 3/2013 | Harata | G06F 21/554 |
| | | | 726/2 |
| 2013/0097708 A1* | 4/2013 | Jayanthi | H04L 63/145 |
| | | | 726/25 |
| 2015/0005982 A1* | 1/2015 | Muthukumar | B60T 8/1725 |
| | | | 701/1 |
| 2015/0006035 A1* | 1/2015 | Ricci | B60R 25/01 |
| | | | 701/99 |
| 2015/0020152 A1* | 1/2015 | Litichever | H04L 63/08 |
| | | | 726/1 |
| 2015/0052352 A1* | 2/2015 | Dolev | H04L 9/3278 |
| | | | 713/156 |
| 2015/0113638 A1* | 4/2015 | Valasek | G06F 21/562 |
| | | | 726/22 |
| 2015/0150124 A1* | 5/2015 | Zhang | G06F 21/51 |
| | | | 726/22 |
| 2015/0191136 A1* | 7/2015 | Ben Noon | H04L 63/14 |
| | | | 726/23 |
| 2015/0195297 A1* | 7/2015 | Ben Noon | H04L 67/12 |
| | | | 726/22 |
| 2015/0264077 A1* | 9/2015 | Berger | G06F 21/51 |
| | | | 726/23 |
| 2015/0271201 A1* | 9/2015 | Ruvio | H04L 67/12 |
| | | | 726/23 |
| 2016/0021127 A1* | 1/2016 | Yan | H04W 12/08 |
| | | | 726/23 |
| 2016/0381055 A1* | 12/2016 | Galula | H04L 63/14 |
| | | | 726/23 |
| 2016/0381067 A1* | 12/2016 | Galula | H04L 63/1416 |
| | | | 726/23 |
| 2016/0381068 A1* | 12/2016 | Galula | G07C 5/0816 |
| | | | 726/23 |
| 2017/0013005 A1* | 1/2017 | Galula | H04L 63/1425 |
| 2017/0093866 A1* | 3/2017 | Ben-Noon | H04W 12/068 |
| 2017/0126711 A1* | 5/2017 | Jung | G05B 15/02 |
| 2017/0142156 A1* | 5/2017 | Shiraishi | G06F 21/52 |
| 2017/0286675 A1* | 10/2017 | Shin | H04L 63/1416 |
| 2017/0295182 A1* | 10/2017 | Teshler | H04L 63/10 |
| 2017/0295188 A1* | 10/2017 | David | G06F 21/125 |
| 2017/0302441 A1* | 10/2017 | Temple | G06F 21/64 |
| 2017/0330466 A1* | 11/2017 | Demetriades | H04W 4/40 |
| 2017/0359365 A1* | 12/2017 | van den Berg | H04W 4/20 |
| 2017/0374493 A1* | 12/2017 | Pereira Cabral | H04W 4/70 |
| 2018/0007076 A1* | 1/2018 | Galula | H04L 69/40 |
| 2018/0063286 A1* | 3/2018 | Braga Ameixieira | H04L 67/34 |
| 2018/0144119 A1* | 5/2018 | Kishikawa | H04L 12/40169 |
| 2018/0205754 A1* | 7/2018 | North | H04L 63/145 |
| 2018/0244238 A1* | 8/2018 | Shah | H04L 9/0825 |
| 2018/0316699 A1* | 11/2018 | David | H04L 63/1425 |
| 2018/0349598 A1* | 12/2018 | Harel | G06F 11/3668 |
| 2018/0349612 A1* | 12/2018 | Harel | G06F 11/0793 |
| 2018/0367554 A1* | 12/2018 | Allouche | G06F 21/554 |
| 2019/0104149 A1* | 4/2019 | Zeng | H04L 9/12 |
| 2019/0207969 A1* | 7/2019 | Brown | G06F 21/552 |
| 2019/0302753 A1* | 10/2019 | Fujii | G08G 1/205 |
| 2019/0306180 A1* | 10/2019 | Dyakin | G06F 21/566 |
| 2019/0312892 A1* | 10/2019 | Chung | G06F 21/554 |
| 2019/0340357 A1* | 11/2019 | David | G06F 21/606 |

FOREIGN PATENT DOCUMENTS

| | | | | |
|---|---|---|---|---|
| JP | 2009-500706 | | 1/2009 | |
| JP | 2017-091541 | | 5/2017 | |
| JP | 2017-111796 | | 6/2017 | |
| WO | WO 2017/042702 | | 3/2017 | |
| WO | WO-2017042702 A1 * | | 3/2017 | .......... G06F 21/121 |
| WO | WO-2017044446 A1 * | | 3/2017 | .......... G06F 21/554 |

OTHER PUBLICATIONS

M. Muter, A. Groll and F. C. Freiling, "A structured approach to anomaly detection for in-vehicle networks," 2010 Sixth International Conference on Information Assurance and Security, Atlanta, GA, USA, 2010, pp. 92-98, doi: 10.1109/ISIAS.2010.5604050. (Year: 2010).*

D.K. Nilsson, U.E. Larson, "Conducting Forensic Investigations of Cyber Attacks on Automobile in-Vehicle Networks," 2009 International Journal of Digital Crime and Forensics, Apr. 2009. (Year: 2009).*

International Search Report of Application No. PCT/IL2018/050888 mailed on Dec. 2, 2018.

Minjin Kwon et al; Probe: A Process Behavior-Based Host Intrusion Prevention System, May 7, 2007, Information Security Practice and Experience; Lecture Notes in Computer Science; Springer Berlin Heidelberg, Berlin, Heidelberg, pp. 203-217, XP019088318, ISBN: 978-3-540-79103-4.

* cited by examiner

SYSTEM AND METHOD FOR DETECTING EXPLOITATION OF A COMPONENT CONNECTED TO AN IN-VEHICLE NETWORK

CROSS-REFERENCE TO RELATED APPLICATIONS

This application is a National Phase Application of PCT International Application No. PCT/IL2018/050888, International Filing Date Aug. 9, 2018, claiming the benefit of U.S. Patent Application No. 62/543,397, filed Aug. 10, 2017, which are hereby incorporated by reference.

FIELD OF THE INVENTION

The present invention relates to prevention of cyber-attacks. More particularly, the present invention relates to systems and methods for detection and prevention of exploitation of components connected to an in-vehicle network.

BACKGROUND OF THE INVENTION

As vehicles become more connected to wireless networks, the risk for cyber attacks increases. Cyber security is especially important when considering autonomous vehicles. As such, an autonomous vehicle fleet should be monitored for cyber security related events in order to both detect and respond to threats.

In-vehicle networks allow internal computer data communications between various components of a vehicle (e.g., air conditioning system, diagnostics, engine, control systems, etc.) by communicating with different electronic control units (ECUs). An electronic control unit may receive input from sensors (e.g., speed, temperature, pressure, etc.) to be used in its analysis and ECUs may exchange data among themselves during the normal operation of the vehicle. For example, the engine may need to tell the transmission what the engine speed is, and the transmission may need to tell other modules when a gear shift occurs. The in-vehicle network allows exchanging data quickly and reliably, with internal communication between the ECUs. The ECUs, some of which may be directly connected to the outside world through external interfaces (such as telematics, multimedia, and driver assistance systems), may pose the highest risk. Such high-performance ECUs may also run a common modern operating system such as Linux, QNX or Android.

SUMMARY OF THE INVENTION

A system and method for detecting cyber threats in a vehicle may detecting an event related to exploitation of a component connected to an in-vehicle network based on a deviation of execution of executable code from a reference execution behavior. A deviation may be detected based on a set of whitelists and blacklists. The blacklists and whitelists may be related to at least one of: a process tree, metadata related to a process, access to a resource, call to a function and an instruction in the executable code. An event related to a deviation may be recorded. A deviation may be identified based on a state of the vehicle or based on a state of a component included in the vehicle.

An embodiment may include a rule engine adapted to associate chains of events with a threat. An embodiment may be adapted to provide a server with data related to detected security threats and the server may be adapted to generate and present data related to a fleet of vehicles.

An embodiment may be adapted to receive events from one or more software sensors. At least some of the software sensors may be adapted to: intercept a system call or an instruction to be executed; detect a security threat based analyzing data related to the intercepted call or instruction; and log the threat. At least some of the software sensors may be adapted block or prevent the call or instruction.

An embodiment may be adapted to: associate a security policy with at least one application; digitally sign the security policy; and verify the security based on a signature. An embodiment may be adapted to: detect a security threat; associate the threat with a confidence level; and select performing at least one action based on the confidence level. An embodiment may be adapted to scan a memory to detect a deviation based on a timer or based on an event.

An embodiment may be adapted to perform at least one action selected from the group consisting of: disabling a component connected to the network, killing a process, activating a component connected to the network, blocking a message, delaying a message, limiting a frequency of a message type, logging a message, alerting a user, modifying content in a message, modifying of attributes of content, modifying metadata related to content, changing permissions of executable code, resetting a component, reverting a component to a known state and executing a process. Other aspects and/or advantages of the present invention are described herein.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
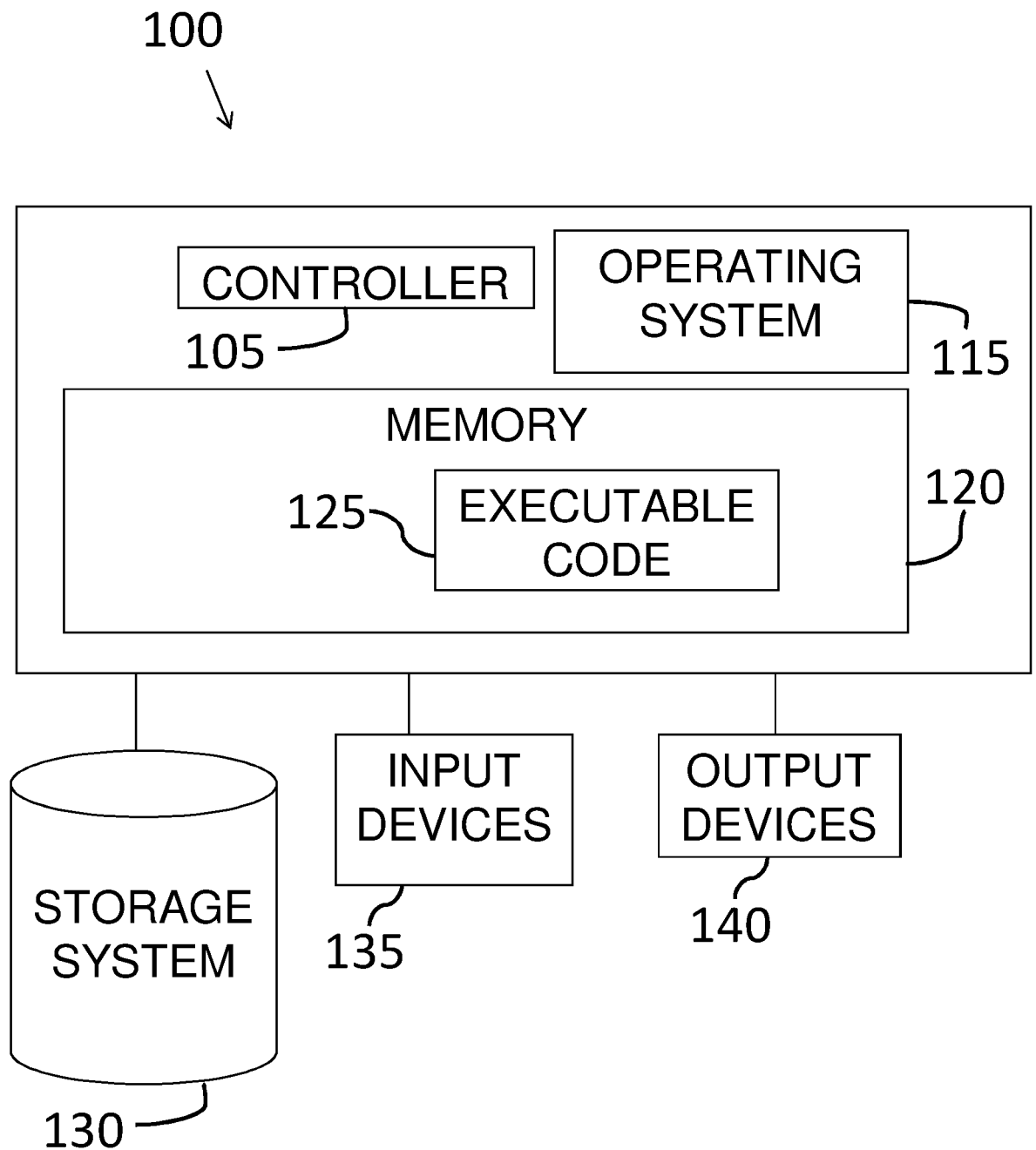
FIG. 1 shows a block diagram of an examplary computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, which shows a block diagram of an examplary computing device, according to some embodiments of the invention. A device 100 may include a controller 105 that may be, for example, a central processing unit processor (CPU), a chip or any suitable computing or computational device, an operating system 115, a memory 120, executable code 125, a storage system 130 that may include input devices 135 and output devices 140. Controller 105 (or one or more controllers or processors, possibly across multiple units or devices) may be configured to carry out methods described herein, and/or to execute or act as the various modules, units, etc. More than one computing device 100 may be included in, and one or more computing devices 100 may act as the components of, a system according to embodiments of the invention.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or tasks or enabling software programs or other modules or units to communicate. Operating system 115 may be a commercial operating system. It will be noted that an operating system 115 may be an optional component, e.g., in some embodiments, a system may include a computing device that does not require or include an operating system 115. For example, a computer system may be, or may include, a microcontroller, an application specific circuit (ASIC), a field programmable array (FPGA) and/or system on a chip (SOC) that may be used without an operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Hash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that enforces security in a vehicle as further described herein, for example, detects or prevents cyber-attacks on in-vehicle networks. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. Where applicable, the terms "process" and "executable code" may mean the same thing and may be used interchangeably herein. For example, verification, validation and/or authentication of a process may mean verification, validation and/or authentication of executable code.

Storage system 130 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include any suitable input devices, components or systems, e.g., physical sensors such as accelerometers, tachometers, thermometers, etc., a detachable keyboard or keypad, a mouse and the like. Output devices 140 may include one or more (possibly detachable) displays or monitors, motors, servo motors, speakers and/or any other suitable output devices. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140. It will be recognized that any suitable number of input devices 135 and output device 140 may be operatively connected to computing device 100 as shown by blocks 135 and 140. For example, input devices 135 and output devices 140 may be used by a technician or engineer in order to connect to a computing device 100, update software and the like. Input and/or output devices or components 135 and 140 may be adapted to interface or communicate, with control or other units in a vehicle, e.g., input and/or output devices or components 135 and 140 may include ports that enable device 100 to communicate with an engine control unit, a suspension control unit, a traction control and the like.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 120, computer-executable instructions such as executable code 125 and a controller such as controller 105.

The storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

In some embodiments, a system may include or may be, for example, a plurality of components that include a respective plurality of central processing units, e.g., a plurality of CPUs as described, a plurality of CPUs embedded in an on board, or in-vehicle, system or network, a plurality of chips, FPGAs or SOCs, a plurality of computer or network devices, or any other suitable computing device. For example, a system as described herein may include one or more devices such as computing device 100.

Figure 2:
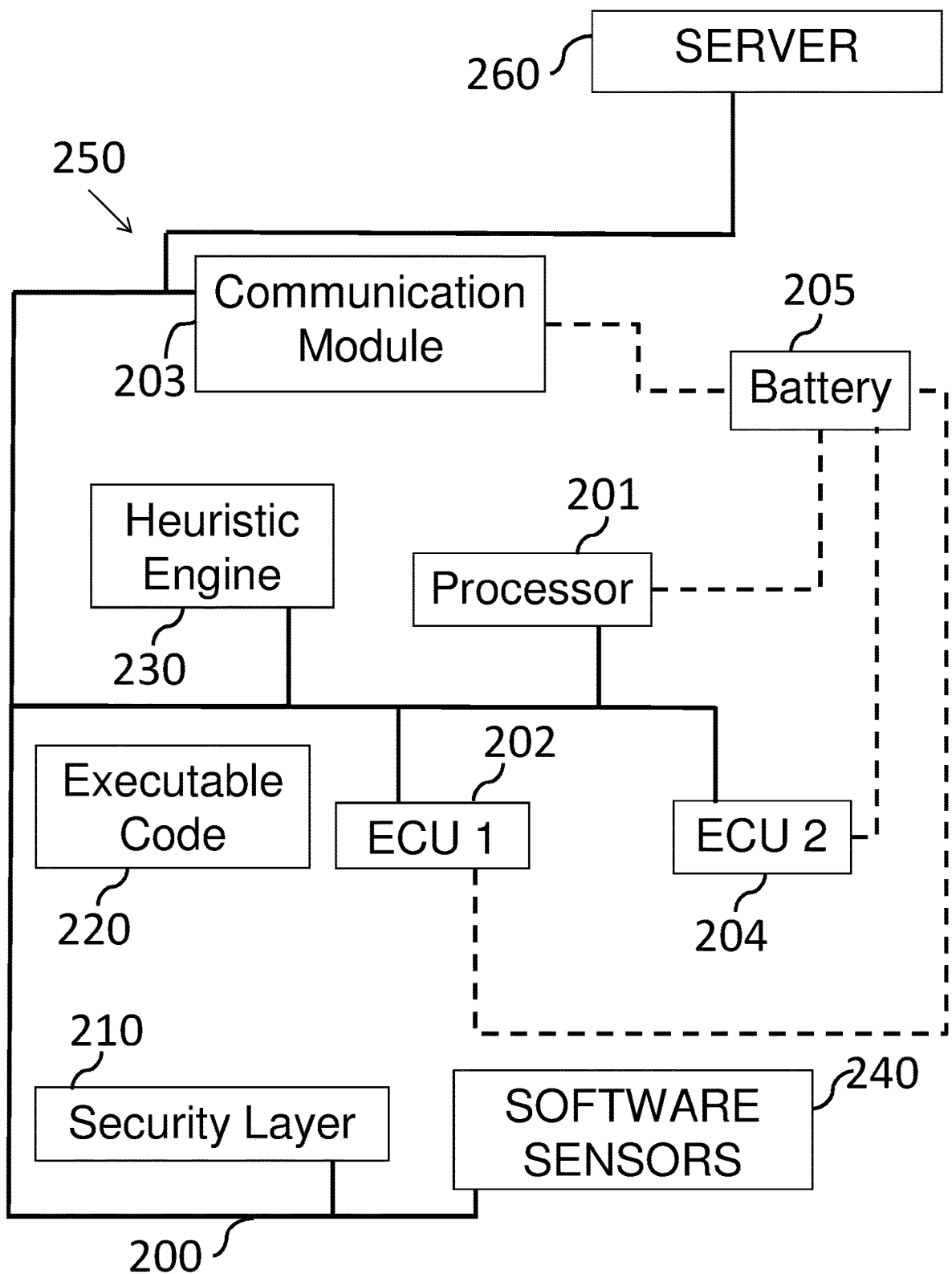
FIG. 2 shows a block diagram of a system for detecting attacks on in-vehicle networks, according to some embodiments of the invention.

Reference is made to FIG. 2, which shows a block diagram of a system for detecting anomalies, cyber-threats and attacks on in-vehicle networks, according to some embodiments of the invention. Some embodiments may include, or they may be connected to a server 260 as shown. For example, server 260 may communicate with security layer 210 (or any other component connected to in-vehicle network 200) over a wireless communication network. Server 260 may be any suitable server or computer. In some embodiments, such a system 250 may be embedded in an in-vehicle network 200 (or vehicle bus), for instance integrated into a vehicle electronic control unit (ECU) in order to detect attacks on the in-vehicle network 200. As shown, system 250 may include a processor 201, a heuristic (or rule) engine 230, executable code 220, security layer 210, software sensors 240, ECU 202 and ECU 204. As further shown, system 250 may be connected to a battery 205 or other power source(s) and to a communication module 203.

The units and components in FIG. 2 may be connected by one or more networks, for example, by in-vehicle network 200 as shown and described or by any other network, e.g., a Controller Area Network (CAN) bus, a wireless network or an Ethernet network. Networks 200 may include for example wireless networks. Further, some of the units in FIG. 2 may connect to units outside the vehicle via for example wireless networks, e.g., a component adapted to communicate over a cellular network may be connected to in-vehicle network 200 and may enable units and components connected to network 200 to communicate with units, devices and systems outside the vehicle. For example, a device adapted to communicate over cellular networks and connected to in-vehicle network 200 may enable security layer 210 to communicate with server 260.

As shown in FIG. 2, in-vehicle network 200 may be connected to modules, units and components in a vehicle and may enable such modules, units and components to communicate. For simplicity, in-vehicle network 200 as referred to herein may be, may include, or may relate to, the network itself (e.g., a CAN bus or an Ethernet infrastructure) and components connected thereto. In-vehicle network 200 may include a processor 201 (e.g., such as controller 105 shown in FIG. 1) in communication with other components of in-vehicle network 200 (where communication is indicated with arrows in FIG. 2). In some embodiments, communication between components of in-vehicle network 200 may be carried out with at least one security layer 210, e.g., security layer 210 may be a computing unit or a software module that includes, or is implemented or executed by, controller 105, memory 120 and executable code 125 or by processor 201. Various components if in-vehicle network 200, such as for example ECUs 202 and 204, may be or include systems such as described in FIG. 1.

The terms anomaly, threat, cyber-threat and risk, as referred to herein, may relate to the same and may be used interchangeably. For example, when detected, an anomaly may be considered a threat or risk. Similarly, a cyber-threat is considered a risk and is typically an anomaly and not a normal or expected event or thing.

In some embodiments, processor 201 may be coupled to at least one ECU 202, 204 and analyze operations of ECUs coupled thereto. It should be noted that each of processor 201 and ECUs 202, 204 coupled thereto may be considered as a node of the in-vehicle network 200. In some embodiments, communication between nodes of in-vehicle network 200 may be carried out at least partially with wireless communication (e.g., via the Bluetooth communications protocol). In some embodiments, in-vehicle network 200 may include a communication module 203 configured to allow wireless communication with external devices, for example to allow a navigation system to communicate with satellites and/or to allow receiving messages (e.g., a time stamp) from external sources. In some embodiments, in-vehicle network 200 may include a battery 205 (e.g., the battery of the vehicle) to power components of the in-vehicle network 200.

According to some embodiments, at least one node of in-vehicle network 200 may analyze and/or process data to detect attacks on the in-vehicle network 200. In some embodiments, at least one computing device (such as device 100, as shown in FIG. 1) may be embedded into in-vehicle network 200 and process data from the network to detect attacks on the in-vehicle network 200. At least one computing device (such as device 100, as shown in FIG. 1) may be embedded into at least one node of in-vehicle network 200 and process data from that node and/or from the network to detect attacks on the in-vehicle network 200. Security layer 210 may be, or may include, a code verification layer adapted to verify all executable code 220 on the system 250 upon loading (e.g., including process execution, library loading, script reading, etc.). In some embodiments, security layer 210 may be configured to analyze executable code 220 during runtime to detect modifications.

At least one node of in-vehicle network 200 may analyze and/or process data to detect attacks on the in-vehicle network 200. In some embodiments, at least one computing device (such as device 100, as shown in FIG. 1) may be embedded into in-vehicle network 200 and process data from the network to detect attacks on the in-vehicle network 200. At least one computing device (such as device 100, as shown in FIG. 1) may be embedded into at least one node (e.g., ECU 202) of in-vehicle network 200 and process data from that node and/or from the network to detect attacks on the in-vehicle network 200. According to some embodiments, the at least one security layer 210 may include a code verification (or authentication) layer to verify and/or authenticate executable code 220 on the system 250 before, upon or after loading executable code 220 into memory (e.g., into memory 120) and/or before, upon or after executing executable code 220, e.g., by controller 105.

Generally, verification, validation and/or authentication of executable code as described and referred to herein may include ascertaining and/or determining that a file or other object that is presented or represented as including executable code or data indeed actually includes executable code and/or additional data as expected. For example, a hash value or other function applied to executable code stored in a file or in memory may be used to calculate a hash value that may be used (e.g., by comparing it to a reference hash value) to verify that the executable code has not been modified since the reference hash value was calculated (e.g., at production time). Any data or metadata may be used for verification, e.g., a timestamp, a name of, or reference to, a provider of the executable code and so on may be included in a file that includes executable code and a verification, validation and/or authentication as described herein may include verifying that data in a file is as expected. Data used for verification, validation and/or authentication as described herein may be encrypted, e.g., using a private key and may further be decrypted, e.g., by security layer 210 using a corresponding public key.

For example, verification and/or authentication of executable code 220 may be done prior to loading of executable code 220 into memory and, in case validation or authentication fails, loading of executable code 220 into memory may be canceled, prevented or aborted, e.g., if validation or authentication fails controller 105 may prevent executable code 220 from being loaded into memory 120 or controller 105 may abort a loading of executable code 220 into memory 120. Accordingly, embodiments of the invention improve the technology of vehicle computer security by preventing malicious or suspicious code from being loaded into computer memory thus increasing security of systems.

In some embodiments, security layer 210 (or a code verification layer therein) may be configured to analyze, verify and/or authenticate executable code 220 during run-time to detect modifications. As further described herein, modifications of code may be detected or identified by comparing code to a reference code (e.g., comparing bytes or even bits in a code segment, or in code stored in a file, to a reference, or known code segment). For example, in order to increase performance, controller 105 may load executable code 220 into memory 120, start execution of executable code 220 and then, in the background, while executable code 220 is executed, controller 105 may verify and/or authenticate executable code 220 as described. Controller 105 may log validation errors found when verifying and/or validating executable code 220 and, if validation or authentication fails, controller 105 may terminate execution of executable code 220. Accordingly, embodiments of the invention improve the technology of vehicle computer security by allowing a system to operate normally (e.g., load code into memory and begin execution of the code) and then verify that the code is not malicious or otherwise poses a threat as described. Various considerations may be applied such that an embodiment may select whether to verify, authenticate or validate executable code 220 before it is loaded into memory and/or executed or after. For example, an embodiment may validate code before loading it into memory in some, possibly sensitive or high-risk ECUs and, in other, less critical or sensitive ECUs, the embodiment may first load and execute code and then verify its authenticity. Any rule, criterion, heuristic or logic may be applied, by embodiments, in selecting whether to pre-validate code (validate before loading and/or execution) or pos-validate code (validate or authenticate code after it has been loaded into memory and/or begun executing). For example, the state of a vehicle, the state of an ECU, computational load on controller 105 and so on may all be considered by security layer 210 when selecting one of pre-validation or post-validation as described. Accordingly, embodiments of the invention improve the field of cyber-security by enabling a system and method to select an optimal mode of operation that combines, or is based on considerations related to, security, performance, efficiency and cost.

Some embodiments include a security layer adapted to verify executable code on an ECU connected to an in-vehicle network For example, executable code 220 may be executed on, or by, ECU 202 (e.g., by a processor included in ECU 202) and processor 201 may analyze, verify and/or authenticate executable code 220 while (or before, as described) it is executed on or by ECU 202. Verifying and/or authenticating code as described herein may include determining or ascertaining that the code is similar or identical to a reference or known code. For example, verifying and/or authenticating code may include, possibly bit-wise, comparing the code to a reference code to detect or identify modifications made to the code under inspection. In other cases, a hash function may be used, e.g., a hash value may be calculated for a memory segment based on the content in the memory segment such that the hash value uniquely identifies the content of the memory segment (or used for determining whether or not the content in the memory segment is same as, or identical to, a reference code), e.g., if the memory content is changed then re-calculating the hash value would produce a different hash value. Accordingly, verifying or authenticating a memory (or a process code) may include calculating a hash value for the memory or process and comparing the hash value to a reference hash value. For example, a reference hash value may be provided by a manufacturer of an ECU or by a provider of a process code or the reference hash value may be calculated during a learning or initialization phase or stage.

For example, a code or memory segment may be considered, by an embodiment, verified or authenticated if it is same, similar or even identical to a reference code or memory segment. For example, a map and associated metadata as described may be used to verify or authenticate a code or memory segment.

As described, verification, validation and/or authentication of executable code may be performed just before the code is executed, e.g., right after loading of the code into memory 120. Verification, validation and/or authentication of executable code may be triggered by an event. For example, an execution or even intent to execute executable code may cause an embodiment (e.g., controller 105 as described) to verify, validate and/or authenticate the executable code. For example, security layer 210 may be informed, e.g., by OS 115, whenever a request, call or requirement to execute executable code 220 is received or identified and, upon being thus informed, security layer 210 may either delay execution of code 220, verify, validate and/or authenticate code 220 and only then allow or enable code 220 to be executed or, security layer 210 may start or schedule a background verification, validation and/or authentication process as described, e.g., by letting code 220 to execute while a verification, validation and/or authentication process is carried out.

Although shown separate from, or outside, ECUs 202 and 204, in some embodiments some, or event all of: processor 201, engine 230, and security layer 210 may be included or embedded in each of ECUs 202 and 204. Accordingly, one or more units may verify and secure executable code on or for ECUs in a centralized way and, in other embodiments, the function of securing and verifying executable code may be distributed, e.g., performed in, or by protected units or ECUs.

In some embodiments, security layer 210 may use asymmetric cryptography to verify certificates for each file that includes or contains executable code. For example, a certificate may be generated for, and associated with, each file that includes executable code and, if or when an ECU or other protected system is about to execute a process, a certificate associated with the file (e.g., in a filesystem) that contains the code to be executed is used as described for verification, validation and/or authentication of the executable code. In some embodiments, certificates may include at least one of the following: issuer name, issuer public key, issue date, expiration date, hashing algorithm, subject file hash. Such a certificate may describe or include additional security parameters related to a file that includes executable code. For example, these parameters may include allowed path(s), allowed communication data (e.g., interfaces, listening, destination ports, protocols, etc.), and a subject memory map.

It is noted that verification, validation and/or authentication of a process and/or of executable code may be done with respect to content in a file or with respect to content in a memory. For example, verification, validation and/or authentication of a process and/or of executable code may be done with respect to content in a file, e.g., controller 105 may analyze or examine content of a file with respect to a certificate as described (e.g., calculate a certificate or value based on the content of the file and compare the calculated certificate or value to a reference certificate value). In other cases or embodiments, verification, validation and/or authentication of a process and/or of executable code may be done with respect to content in a memory, for example, after executable code 220 is loaded into memory 120 and either before or after execution of the code is commenced, security layer 210 may calculate a certificate or value based on the content of the memory segment that includes executable code 220 and compare the calculated certificate or value to a reference certificate value.

In some embodiments, verification, authentication and/or validation includes using asymmetric cryptography to verify a certificate of executable code. For example, a certificate may be stored in a file system that may be the same file system used for storing executable code (e.g., the way a file is stored in a file system) and a reference, list or table may be used to associate the certificate with the file that includes the associated executable code. Certificates may be stored in a centralized repository on a system. Verification, validation and/or authentication of a process and/or of executable code includes verifying that a certificate was indeed signed by, or signed using, a specific private key which is associated with a respective specific public key which in turn may be stored on the system such that it is available to security unit or layer 210. Accordingly, using a public key, e.g., stored on storage system 130, security layer 210 can validate, authenticate and/or verify executable code as described.

According to some embodiments, security layer 210 may scan, analyze, examine or monitor the memory of running processes and/or libraries for changes in areas which are known to be restricted, for instance in accordance with the memory map. It should be noted that other methods for such monitoring may also be applied. The restrictions may be 'soft', meaning that areas in a memory may change according to a predefined allowed number of possibilities, and/or may be 'hard', meaning that areas in a memory may not change at all during runtime.

In some embodiments, verification includes examining, e.g., by security layer 210, a memory of a running process and selectively detecting modifications to regions of the examined memory. For example, security layer 210 may include (e.g., in a storage system 130) a map of a memory of ECU 202 and the map may include metadata that indicates address ranges and their properties. For example, metadata for a map used by security layer 210 may indicate that address range 0-2048 in a memory in, or of ECU 202 may not be changed (e.g., since this address range includes instructions) and the metadata may further indicate that data in for example address range 2049-4096 in the memory of ECU 202 can be changed (e.g., since this address range is used for storing temporary or transient values of dynamic parameters). Accordingly, in the above example, security layer 210 may ignore changes in address range 2049-4096 but may alert or even stop execution of code in ECU 202 if changes to code in address range 0-2048 are identified or detected.

In some embodiments, if verification, authentication or validation of executable code fails, a system may take preventative actions, e.g., kill or stop execution of the relevant process (violating process), reboot a system, revert to a known state of a system, e.g., an ECU and the like. For example, in embodiments where security layer 210 is embedded or included in an ECU, e.g., in ECU 202, then security layer 210 may perform preventive actions on ECU 202 as described. In other embodiments, e.g., if security layer 210 is separate from ECU 202 then security layer 210 may cause a process (agent as known in the art) executed on ECU 202 to perform preventive actions as described. For example, methods enabling a first program on a first computing device to request a service from a second program in another computing device (e.g., remote procedure call (RPC)) may be used. Any other preventive action may be performed upon failure to verify, authenticate or validate executable, e.g., security layer 210 may, upon failure as described, disable a component connected to an in-vehicle network, activate a component connected to the network, block a message, delay a message, limit a frequency of a message type, log a message and/or generate an alert.

One or more preventative actions as described may be triggered, taken, or performed, by an embodiment, in response to any event related to security of a system in a vehicle. For example, any action may be taken or performed whenever security layer 210 detects an attack using any on the techniques described herein, for example detection of a "dirty" system call, or an unexpected access to system resources. A dirty system call may generally be any unexpected call to a function made by a process (e.g., executable code 220 when executed). For example, a call may be identified as unexpected (dirty) based on a model that includes expected calls and sequences of calls made by a process.

A dirty, unexpected or suspicious operation, behavior or event, e.g., a system call, a call to a function or routine, may be, or may include, for example, a system call related to a debugging API of a system (e.g., ptrace). For example, a debugging API may be used to debug the system (e.g., during development), however, since it is not expected to be used in a production system (e.g., in a car sold to a user) it may be included in a blacklist, or excluded from a whitelist (and thus prevented by security layer 210) or a rule or criterion may cause security layer 210 to prevent a debugging API from being executed.

An embodiment may designate or identify an event, function or operation as dirty, unexpected or suspicious based on a context or state of a vehicle and/or of components connected to an in-vehicle network in the vehicle. A set of whitelists and/or blacklists as described may be associated with a respective set of contexts, accordingly, an embodiment may identify threats or deviations as described according to, or based on, a context or state of a vehicle and/or components in the vehicle. For example, a specific API may be allowed (e.g., included in a whitelist) in when a vehicle is in a first context and prevented (e.g., included in a blacklist that is specific the context or excluded from the whitelist of the context) when the vehicle is in a second context.

A list, or rules used to identify dirty, unexpected or suspicious operations or events may be different for different components in a system. For example, a first instance of security layer 210 in ECU 202 may permit a function that attempts to send data over a wireless network to be executed by, or on, ECU 202 and a second instance of security layer 210 (in ECU 204) may prevent such function from being executed on or by ECU 204. A first set of criteria and/or rules and/or blacklists and whitelists may be used for, or may control operation of, a first ECU and a second, different from the first, set of criteria and/or rules and/or blacklists and whitelists may be used for, or may control operation of, a second ECU. Accordingly, logic, rules, blacklists and whitelists as described herein may be different for different ECUs or components in a system.

Security layer 220 may identify the call as unexpected (e.g. dirty) and may log the function or call (e.g., if the risk it poses is minor), may block the call (e.g., prevent it from being executed) if the risk it poses or the likelihood it is related to an attack is high and so on. Security layer 220 may selectively perform any of the actions described herein in response to any deviation of a system's behavior from an expected behavior, threat or attack as described.

For example, if the behavior of a system deviates from an expected behavior, security layer 210 may perform or take an action that may be, or may include, one or more of: disabling a component connected to an in-vehicle communication network (e.g., shutdown ECU 204), activating a component connected to the network (e.g., turn on ECU 202), blocking a message (e.g., prevent a message sent from ECU 202 to ECU 204 from reaching ECU 204), delaying a message (e.g., delay a message sent from ECU 202 to ECU 204, for example, until it is determined the message is safe or in order to control rate of messages over an in-vehicle network).

In some embodiments, when security layer 210 identifies or detects a dirty, unexpected or suspicious operation or event, security layer 210 kills (e.g. terminates execution of) a process and/or reverts a component or system to a known or predefined state. As with any action performed by security layer 210, killing a process may be done selectively, e.g., based on a configuration, context and/or state of a vehicle and/or context and/or state components in the vehicle. For example, security layer 210 may kill a process that caused or generated an event if the vehicle is in a first state but may reset an ECU if, when the event is detected, the vehicle is in a second, different state.

For example, upon identifying or detecting a dirty, unexpected or suspicious operation or event, or upon detecting a deviation from an expected behavior or flow, security layer 210 may terminate execution of executable code 220 on ECU 204, or security layer 210 may reset ECU 204, or security layer 210 may apply a default or other configuration to ECU 204 and cause ECU 204 to reboot, thus reverting ECU 204 to a known, predefined state. A known or predefined state of a component (e.g., an ECU) may be a special state, not necessarily a previous state, for example, a known or predefined state enforced on one or more ECUs may be a limp home state or mode (e.g., one enabling a driver to get home quickly and safely) whereby the functionality of a vehicle is limited (e.g., max speed is limited, head lights cannot be turned off and so on).

If the behavior of a system deviates from an expected behavior or flow, or an event related to security of a system in a vehicle is detected, security layer 210 may perform or take an action that may be, or may include, one or more of: limiting a frequency of a specific message type (e.g., apply rate control to messages with a specific ID), logging a message (e.g., store any metadata data and/or content such that offline analysis can be performed), alerting a user (e.g., send an electronic mail to a predefined set of recipients, displaying message on an infotainment system's screen, sound an alarm and so on).

In some embodiments, to verify or authenticate executable code, security layer 210 compares code in a memory to reference code. For example, security layer 210 may be provided with a reference map of a memory and may compare the memory of ECU 202 with the reference map thus detecting changes or deviations from the reference map. Security layer 210 may generate the reference map. For example, during a learning phase security layer 210 may record or store an image of a memory in ECU 202 and used the recorded image as the reference map. In other embodiments, the reference map may be provided, e.g., by a manufacturer of ECU 202.

If a change of a memory is detected (or a deviation from a reference map as described) then security layer 210 (or processor 201) may perform one or more actions. For example, if a change of a memory, or a deviation from a reference map is detected as described then processor 201 may issue an alert or warning, e.g., send an electronic mail (email) message or a short message service (SMS) message to a predefined list of recipients and/or display a message on an infotainment screen in a vehicle. An action performed upon detecting a change of a memory, or a deviation from a reference map may include halting an ECU, e.g., shutting down the ECU or it may include preventing the ECU from communicating over an in-vehicle network. Any other action may be performed.

Security layer 210 may periodically (e.g., once every 5 minutes) scan the memory of the system 250. Security layer 210 may periodically monitor the state of system 250, e.g., security layer 210 may periodically check the health of ECUs 202 and 204, e.g., CPU utilization on ECUs 202 and 204, check how much of their memory is used, check how much data is stored in connected flash or other storage devices and so on. A reference state that includes, for example, a set of values indicating resources usage, e.g., usage or consumption of CPU cycles or power, storage and memory may be stored in storage system 130 and security layer 210 may compare a state of an ECU to a reference state, e.g., compare the amount of occupied memory in ECU 202 to memory occupation in a reference state, compare the utilization of a CPU in ECU 204 to a reference utilization in a reference state and so on. In some embodiments security layer 210 checks the state of ECUs based on an event. For example, an event may be starting the engine, detecting a deviation from a reference execution as described herein, connection of a new device to in-vehicle network 200, the vehicle traveling at a speed greater than a predefined speed, a timer expiration or any other event.

For example, a timer executed by processor 201 may cause security layer 210 to scan, verify and/or authenticate code or memory in ECUs 202 and 204 every hour, every day and so on. An event in the system 250 may trigger security layer 210 (or a code verification layer in security layer 210) to scan the memory of the system 250. For example, such an event may be at least one of: starting the engine of a vehicle, unlocking doors of a vehicle, execution of a process in an ECU, access to a file by code in an ECU, a communication event, e.g., sending a message from one ECU to another, receiving input from a user receiving input from an entity in a system, e.g., receiving input from ECU 202 by ECU 204.

An embodiment may scan and/or authenticate a memory as describe upon detecting a suspicious set of events or states. For example, processor 201 may be informed by ECU 202 that the vehicle is traveling at 55 miles per hour (mph) and may further be informed by ECU 204 that one of the doors of the vehicle is open, such set of suspicious events or states (the vehicle is traveling fast and a door is open) may cause security layer to scan and/or authenticate code in at least some ECUs, e.g., in the above example, at least the code executed by ECUs 202 and 204 may be scanned and authenticated, e.g., since a situation where a vehicle is traveling at 55 mph while a door is open is suspicious and/or unlikely.

Figure 3:
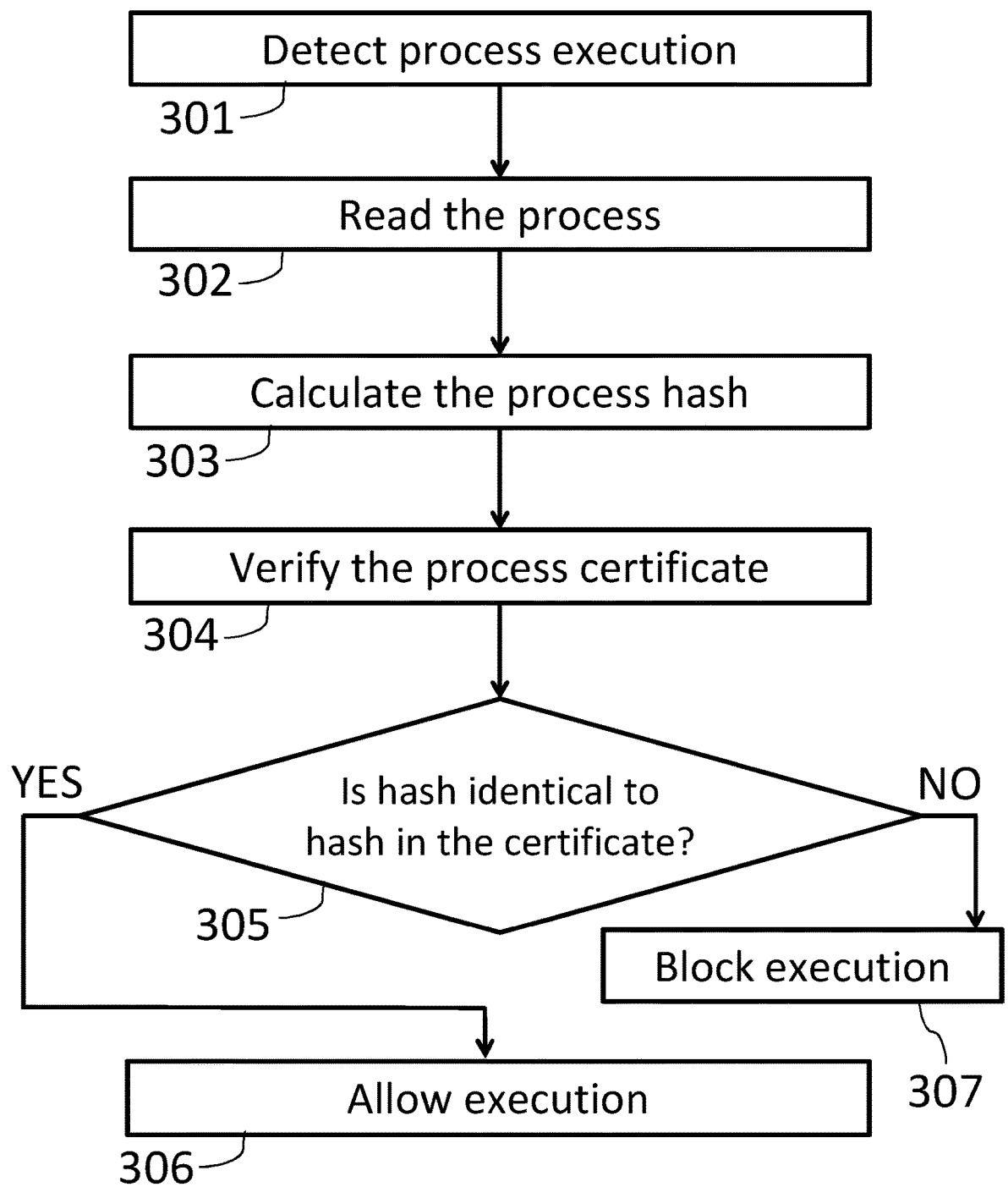
FIG. 3 shows a flowchart of a method of execution verification, according to some embodiments of the invention.

In some embodiments, security layer 210 performs verification of code based on one of: a time interval and an event. Reference is made to FIG. 3, which show a flowchart of a method of execution verification, according to some embodiments of the invention. Methods of detecting attacks on in-vehicle networks as described herein may be performed by computing device 100 (as shown in FIG. 1) or by any other computation device embedded at in-vehicle network 200 (as shown in FIG. 2).

Security layer 210 may verify the file execution and/or file load in parallel mode or in series mode. While in series mode, security layer 210 may first verify the process and only upon verification allow it to be loaded and/or executed. In case that the verification fails, security layer 210 may prevent the loading and/or execution altogether and/or perform some other action, as defined in its configuration. While in parallel mode, security layer 210 may allow the file to execute and/or be loaded into a memory and verify it while it is executed. In some embodiments, system 250 may use cache in order to optimize which files are to be verified at a given time and/or state of the system.

Security layer 210 may verify the file execution and/or file load in parallel mode or in series mode. While in series mode, security layer 210 may first verify the process and only upon verification allow it to be loaded and/or executed. In case that the verification fails, security layer 210 may prevent the loading and/or execution altogether and/or perform some other action, as defined in its configuration. While in parallel mode, security layer 210 may allow the file to execute and/or load, and verify it while it is executed. In some embodiments, system 250 may use cache in order to optimize which files are to be verified at a given time and/or state of the system.

In some embodiments, verification is selectively performed either before or after the executable code is loaded into memory (e.g., into memory 120 in preparation for execution), in some embodiments, verification is selectively performed either before or after the executable code is executed (e.g., after the code is loaded into memory but before it is executed by controller 105).

Security layer 210 may detect 301 process execution. For example, by receiving signal, messages or events from an operating system in ECU 202, security layer 210 or processor 201 may detect, determine or identify that a process has been invoked in ECU 202. Security layer 210 may read 302 the memory where the invoked process is loaded. Security layer 210 may calculate 303 the process hash and verify 304 the process certificate. For example, a certificate may be, or may include, a value calculated based on an authenticated or verified code of a process. For example, a provider of a process or software to be executed on ECU 202 may provide a certificate that is generated or calculated based on an original code of a process to be executed on ECU 202. In other cases, a certificate may be generated or calculated by processor 201, e.g., based on code of a process stored in storage system 130 or loaded into a memory of ECU 204. For example, during an initialization stage of a system, processor 201 may calculate a certificate or hash value for each process in ECU 202 and may subsequently use the certificates as described. Security layer 210 may compare 305 the process hash with the hash in the certificate. In case that the process hash is identical to the hash in the certificate, security layer 210 may allow 306 the execution. In case that the process hash is not identical to the hash in the certificate, security layer 210 may block 307 the execution, and thereby prevent an attack.

In some embodiments, security layer 210 is adapted to detect an execution of a process, calculate a hash value based on the code of the process, and verify the process by comparing the calculated hash value to a certificate of (or associated with) the executable code (process). As described, the hash value may be calculated for executable code in a file (e.g., by reading data from a file, before loading the executable code into memory) or the hash value may be calculated based on executable code already loaded into a memory 120, e.g., by reading the executable code from memory 120. For example, to increase responsiveness of a system, security layer 210 may be configured to verify code after it is executed thus speeding the response time of executable code, to increase security, security layer 210 may be configured to verify code before it is loaded into memory.

It should be noted that due to the long lifespan of vehicles (e.g., several years, or even over a decade) an attacker may have more opportunities to bypass existing defenses, taking advantage of various vulnerabilities. In order to protect against such threats, ECUs 202, 204 of system 250 may operate with a heuristic behavior-based threat detection engine, to detect when such a breach occurs.

In some embodiments, such breach detection may occur at an early stage based on a behavioral analysis approach. Since such detection system may be based on detection of unexpected behavior, it may be able to detect attacks regardless of the type of vulnerability exploited (e.g., either logical vulnerabilities or in memory, implementation-based vulnerabilities such as buffer overflows).

In some embodiments, security layer 210 and/or a security policy identify a threat based on a deviation of a behavior of a system from an expected behavior. In some embodiments security layer 210 is adapted to detect security threats based on a deviation from a behavior, e.g., a behavior defined using behavioral analysis. A detection system may be configured to respond autonomously (e.g., offline) so as to contain and/or neutralize a cyber-threat (e.g., an attempt to gain control of an ECU or any other attack) without the need for online connectivity and/or user interaction. For example, once an anomalous event (e.g., a modification of executable code as described) has been detected, the detection system (e.g., security layer 210) may trigger a response according to a predefined security policy of the system. For example, possible responses may be to kill a process, restart it, revert a system to a known state (e.g., "limp home" state or loading a backup code), and/or log the event. In some embodiments, a detection system (e.g., security layer 210) may ask an operator of the vehicle for instructions related to the detected event.

Some embodiments are adapted to autonomously respond to a threat. Reference is made back to FIG. 2.

In some embodiments, a heuristic (or rule) engine 230 (e.g., coupled to processor 201) may be used to detect anomalies in the detection system. Heuristic engine 230 may use a set of heuristics to define chains of events which are considered anomalous. An embodiment may include a heuristics engine adapted to associate chains of events with a threat or an anomaly.

For example, hooks to an operating system in ECU 202 may be used to enable heuristic engine 230 to detect any relevant event, e.g., an execution of a process, an access to a resource (e.g., accessing a wireless communication device, reading data from a sensor, accessing a file or attempting to use an interface port or an ECU). Heuristic engine 230 may detect anomalies based on at least one of the following models: detection of deviation from expected resource consumption levels (e.g., power consumption by an ECU, excessive access to a file system or memory), detection of deviation from expected process privileges (e.g., attempt to access a restricted memory segment, attempt to access specific files), detection of anomalous execution patterns (e.g., an execution of a specific sequence of programs, consecutive or repetitive executions of the same process in a short time interval), detection of calls to, or usage of, blacklisted application program interface (API) calls, detection of irregular network activity (e.g., retransmissions of packets, repetitive attempts to communicate with sensitive components), and/or detection of anomalous access to sensitive resources. Any policy, rules, criteria or thresholds may be used by heuristic engine 230 to identify or detect an anomalous or suspicious behavior. For example, a rule may define the number of times per second a resource may be accessed, or a rule may define a number of messages sent over a network to a specific destination and so on. Rules, criteria or heuristics as described herein may be dynamically defined and/or updated. For example, heuristic engine 230 may monitor process, record their behavior, e.g., heuristic engine 230 may record, for some processes, the CPU consumption, network activity, access to files and the like and thus generate a profile for process, such profiles may then be used to detect a deviation from an expected, normal behavior of processes. If heuristic engine 230 detects a deviation of a behavior or an anomaly as described, heuristic engine 230 may perform any action as described, e.g., alert a user, stop a process and so on.

In some embodiments, a detection system (e.g., in-vehicle network 200 or system 250 including security layer 210, heuristic or rule engine 230 and/or processor 201) may be an on-board system (e.g., with at least one ECU) accompanied by an off-board monitoring and control backend system. For example, an off-board system may be included in server 260 and may communicate with a plurality of systems 250 in a respective plurality of vehicles. An off-board system may present the detections to a fleet manager and may also be able to classify data regarding the potential severity and/or scope of the detections.

Embodiments of the invention may send any data (e.g., calculated as described and/or collected from sensors) to server 260 that may be located outside of the vehicle and, server 260 may use the data to generate and present data related to a fleet of vehicles. An off-board detection system may also allow a security analyst to filter events from a display or presentation of the data, e.g., events may be presented in sorted lists and filters may be used to remove some events from presented lists such that only events or interest are shown. An off-board system may allow an operator to configure the system, for example, enable an operator to remotely control systems 250 in vehicles, e.g., such that some events are filtered (e.g., not reported to the off-board system) by the systems 250. Accordingly, an embodiment may enable a fleet manager to see, e.g., on a singly screen, events related to a plurality of vehicles in the fleet as well as remotely control operation of security systems in the fleet's vehicles.

Some embodiments may be adapted to receive data regarding events from one or more software sensors. According to some embodiments, input to heuristic engine 230 may include events received from multiple sensors throughout system 250, where the sensors may create events which are the basic building blocks of the heuristic engine 230. Sensors may be specifically built and introduced to the system especially for the heuristic engine 230 and/or may be repurposed from existing modules in the system 250. Software sensors 240 may be used and may provide input to heuristic engine 230. Generally, software sensors may be executable code (e.g., similar to executable code 125) that may sense software events. For example, software sensors 240 may include executable code adapted to detect events such as accessing a file or memory in system 250, sending data over a network, executing a process and so on. Software sensors 240 may collect and/or generate sensor data that may include information related to one or more of: system calls, Linux audit events, new and/or existing incoming and/or outgoing connections, process forks and/or executions, library loads, access and/or read and/or write and/or modify status of any system resource (e.g., file, shared memory, global object, etc.), memory or CPU usage, login attempts, and/or inter process communication (IPC) messages.

In some embodiments, various events received at the heuristic engine 230 may be analyzed according to a set of extendable and/or configurable and/or modular heuristics. These heuristics may be independent of each other and each may for instance look at a different set of events. For example, a heuristic engine 230 may check for at least one of the following heuristics on a vehicular ECU: execution of a new and/or recently modified file, modification of a root owned file, script engine reading a new/recently modified file where the script engine may be any process configured to be a script engine—bash, dash, python, pearl, luna, etc., file execution/load from a 'forbidden' folder, such as "/tmp" or "/media", and/or modification of a memory page's attributes from "w/rw" to "x", or from "x" to "w/rw". In another example, heuristic engine 230 may check for at least one of the following heuristics on a vehicular ECU: a root process executed suspiciously after a segmentation fault in the system, a process is executed by a user it is not configured to run as 'root', process runs with environment variables set to values not as configured (e.g., LD_PRELOAD or PATH), repeated failing attempts to open a certain file for writing, usage of blacklisted system calls, like 'ptrace', modification of a file's timestamps (e.g., using "syscall utimensat"), process executes other processes or utilities it is not configured to execute, process calls "syscalls" it is not configured to call, process has more and/or less running instances than configured.

In some embodiments, heuristic or rule engine 230 checks for at least one of the following heuristics on a vehicular ECU: a common process is copied and/or moved and/or renamed to a new location, a process registers a desktop BUS (DBUS) service which is usually started by a different process, a process attempts and fails to register a DBUS service it usually succeeds, a process queries/requests a DBUS-service with an API it is not configured to use, a process queries DBUS introspection or similar unusual queries, a DBUS authentication error message received (e.g., AuthFailed), a failed login attempt to the system (or over a configurable number), and/or the number of logged-in users is over the configured number. In another example, heuristic engine 230 may check for at least one of the following heuristics on a vehicular ECU: a process attempts to open a device (e.g., "/dev/can") it is not configured to open, an interactive process which usually only accesses a device and/or file, etc. while its window is in the foreground accesses it when in background, volume is modified by a call to an API which is not usually called, a process which is not configured to communicate over the network attempts to connect over the network, a process starts listening on a TCP and/or UDP port which it doesn't usually listen on, an IP conflict is detected in the system, a process attempts to read major system file it is not specifically allowed to (e.g., "/etc/sysctl.conf", "/etc/pam.conf, /etc/shadow", etc.), and/or kernel parameters are modified in "/proc/sysf" and/or "/proc/net" directory (routes, net interfaces). Heuristic or rule engine 230 may generate (e.g., during a learning phase) or it may be provided with, a list of permitted or expected operations or events for each of a plurality of processes in ECUs 202 and 204. For example, a list may indicate that a specific process, script or program is allowed to access files in a first folder, accordingly, if the process accesses files in a second, different folder, heuristic or rule engine 230 may determine a rule was breached and may perform an action (e.g., report the event, terminate the process and so on). Lists for processes used by heuristic or rule engine 230 as described may include any events, permissions and the like, for example, lists used by heuristic or rule engine 230 may include allowed or permitted operations, network connections or activities, allowed or restricted resources and so on, e.g., process A is permitted to use a display, process B in ECU 202 is allowed to communicate with ECU 204, process C is restricted from accessing folder/proc/conf. Lists for processes used by heuristic or rule engine 230 may be related to any one of: a modification of content (e.g., adding or removing data to/from a file), a modification of attributes of content (e.g., changing an attribute of a file from read only to read write), a modification of metadata related to content, permissions and operations and executions of processes.

Some embodiments include a rule engine adapted to identify an anomaly (e.g., failure to verify or authenticate code as described) based on heuristics (e.g., implemented using rules in a rule engine, unit or module) applied to at least one of: a modification of content, a modification of attributes of content, a modification of metadata related to content, permissions, operations and executions of processes.

In some embodiments, exceptions or events (e.g., a deviation from a reference execution flow, a failure to verify code or an outcome of a validation process as described) may be associate with a whitelist or with a black list, rules applied as described may be related, or based on, white and black lists.

Detection system 250 may include a set of whitelists that are associated with one or more of the heuristics. The whitelists may include a set of exceptions to the associated heuristics. For example, a whitelist may include a list of processes that are allowed to run with root privileges. In another example, a whitelist may include a list of process pairs where each pair may describe a parent and/or child relationship that is expected to be seen on the target ECU 202. Detection system 250 may include a set of blacklists that are associated with one or more of the heuristics. For example, a blacklist may include a list of processes which may not be run at root privileges.

In some embodiments, verification, authentication and/or validation of executable code or detecting a deviation from an expected behavior includes detecting an event related to exploitation of a component connected to an in-vehicle network based on a deviation of execution of executable code from a reference execution behavior, e.g., using information related to a process tree. For example, according to a rule in security layer 210, spawning a particular child process may be allowed for a first process but forbidden for a second process, thus, an event of spawning a child process by the second process may be identified as an anomaly, threat or deviation from an expected behavior as described.

In embodiments, security layer 210 may monitor, check or examine (e.g., periodically or otherwise) permissions of processes executed on an ECU and compare the permissions to predefined or expected permissions, if permissions or privileges of a process are not as expected, an embodiment may perform a preventive or other action as described. For example, a changing of access rights to resources of a process (something a first running process can cause for another running process) may be detected and identified as a deviation from an expected behavior or threat and may be acted upon as referred to herein.

Detection system 250 may associate each detection with a confidence level. For example, the level of confidence may derive from the type of detection and/or the heuristic that generated it and/or the parameters of the heuristic and/or vehicle state and/or previous alerts on the vehicle. Detection system 250 may be configured to react to events or alerts based on their level of confidence.

For example, an event that includes a failure to authenticate executable code associated with a relatively high degree of confidence may cause an embodiment to block messages as described herein or to isolate a component for an in-vehicle network, while an event that includes a failure to authenticate executable code associated with a relatively low degree of confidence may only be logged. The level of confidence may be dependent on any applicable data.

In some embodiments security layer 210 is adapted to detect a security threat, associate the threat with a confidence level and, select to perform at least one action based on the confidence level. In some embodiments, the level of confidence is associated with what is detected. For example, if an embodiment fails to authenticate executable code then it may be assumed an attack is in progress or was identified and high confidence level or value may be associated with the event or detection, e.g., causing embodiments to take preventive measures as described. However, if minor deviation from an expected behavior or flow is detected then a low confidence level may be associated with the detection, e.g., causing an embodiment to only report the detection.

Detection system 250 may associate each detection with a risk level. In some embodiments, a level of risk (risk level) is determined or calculated based on a resource associated with an event. For example, if executable code fails a validation or authentication and the code is of a non-critical process in an ECU, e.g., one that controls the air conditioning (AC) system then an embodiment may associate such failure event with a low risk level or risk-level (e.g., "2") but if failure to authenticate executable code occurs for critical code in an ECU, e.g., one that controls the engine or wireless communication then an embodiment may associate the failure event with a high risk level or value (e.g., "8.5").

A level of risk may be determined or calculated based on a context or state of a vehicle or of a component connected to an in-vehicle network. For example, an embodiment may associate a low risk level or value with failure to authenticate executable code while the vehicle (that includes an embodiment) is parked and/or the engine is not running (first state or context) and the embodiment may associate a high risk level (risk-level) with failure to authenticate the same executable code while the vehicle is travelling at 50 miles per hour (second state or context).

The terms "state", context, "vehicle context" and "vehicle state" as referred to herein may relate to any configuration, operational or functional aspects of one or more of: a vehicle, an in-vehicle network, and/or one or more nodes connected to the in-vehicle network. For example, a state or context of a vehicle may be defined based on data received, e.g., by security layer 210 from one or more sensors or nodes in the vehicle. For example, a state or context may be determined based on one or more of: vehicle's speed, acceleration, closing speed to a leading or trailing vehicle, engine revolutions per minute (rpm), engine temperature, oil pressure, hydraulic pressure, wheel traction, road condition, vehicle location, weather condition and so on. A context may be determined based on content of messages. For example, a message from an ECU reporting a change of speed, rpm, opening of a door and so on may cause security layer 210 to determine a state or context of a vehicle.

Detection system 250 may be configured to react to events or alerts based on their level of risk. For example, security layer 210 may only log an event with a low risk level or value, alert the driver in case an event is associated with a medium risk level, block messages from a specific component following an event with a high risk-level and disable a component in a vehicle for yet higher risk levels.

In some embodiments security layer 210 is adapted to associate a security policy with at least one application and digitally sign the security policy. In some embodiments, ECUs 202 and 204 may support installation of new applications by the vehicle operator. The detection system 250 may support a security policy for each application. A security policy may define the different heuristics, criteria or rules associated with an application, e.g., a set of rules or heuristics as described may be associated with each application installed in ECUs 202 and 204. A security policy may include a set of whitelists and/or blacklists related to one or more of the heuristics as described. In some embodiments, the security policy for each application is digitally signed in order to enable verification of its authenticity. In some embodiments, a security policy may be distributed and deployed to the target ECU 202, 204 with the associated application.

In some embodiments security layer 210 is adapted to receive at least one sensor event and identify an anomaly based on a type of the event and based on a security policy.

Figure 4:
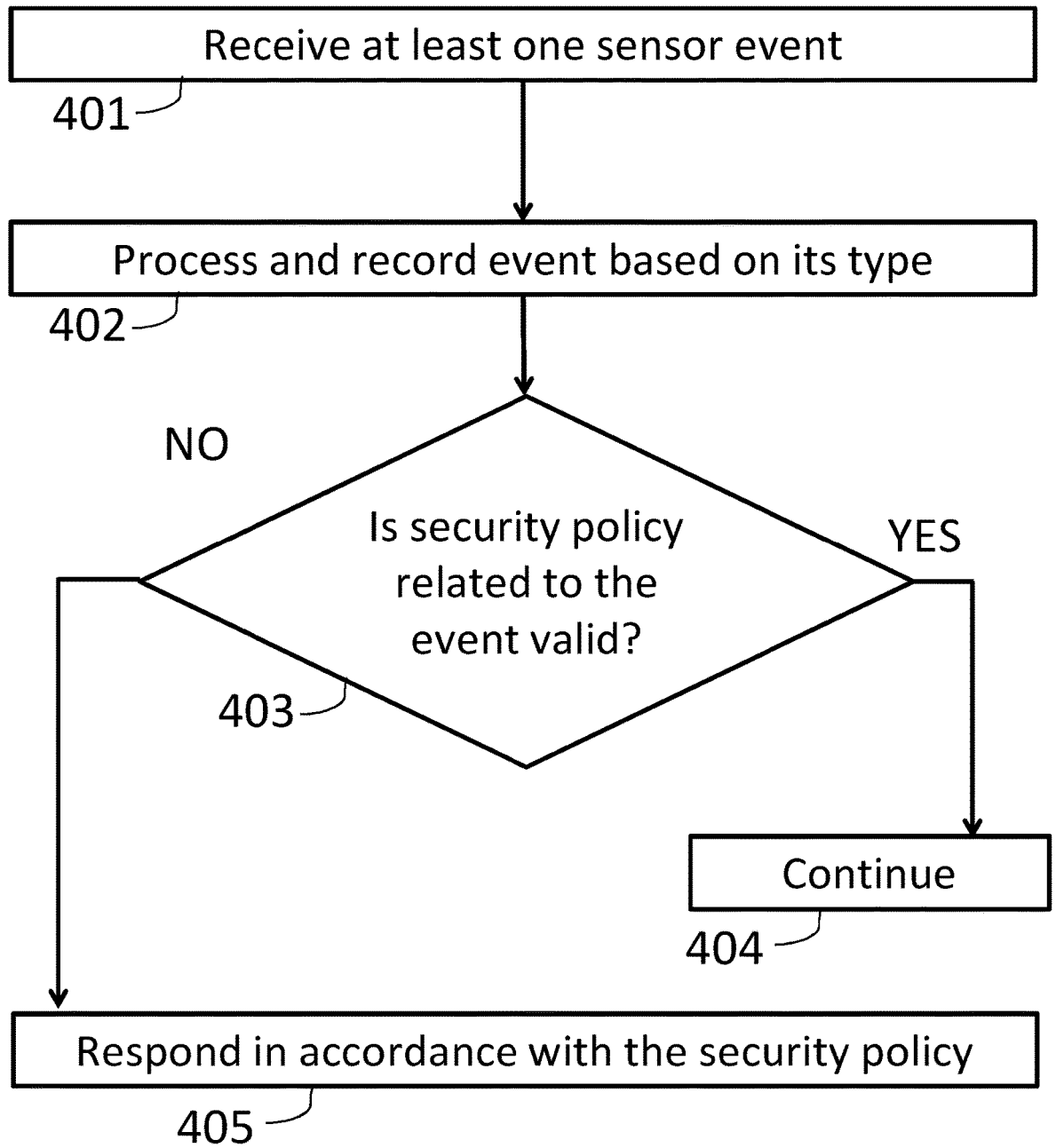
FIG. 4 shows a flowchart of a method of detecting attacks on in-vehicle networks, according to some embodiments of the invention.

Reference is made to FIG. 4, which shows a flowchart of a method of detecting attacks on in-vehicle networks, according to some embodiments of the invention. As shown, processor 201 may receive 401 at least one sensor event and process 402 and record the event based on its type. The processor 201 may then check 403 if the security policy is valid. In case that the security policy is valid, the execution of the event may continue 404. In case that the security policy is anomalous, the processor 201 may respond 405 in accordance with the security policy. A policy may be stored, e.g., in storage system 130. For example, a file or segment in memory may include heuristics, criteria, conditions, rules and actions that define or constitute a policy. A policy may be secured, e.g., a policy may be associated with a certificate as described, data in or of a policy may be encrypted and/or signed. To determine whether or not a policy is valid, security layer 210 may validate, authenticate and/or verify the policy, e.g., as described herein with respect to validation and authentication of executable code, for example using a certificate associated with a policy. Accordingly, embodiments of the invention may determine whether or not a policy was modified (e.g., by an attacker) and, if it is determined the policy was modified, an embodiment may avoid using the policy, may generate an alert and/or take any action as described herein.

Security layer 210 may update a security policy based on recording a behavior of a system. A security policy of the detection system 250 may be defined based on the behavior of a clean (or calibrated) system. The configuration process may be iterative and may start with an initial predefined configuration which includes the default parameters for each heuristic. In some embodiments, such configuration may be permissive. The system may then be put in a learning-mode and allowed to run normally, and may be used in a typical manner while going through all the different features of the system based on a predefined script. The detection logs may be used as input along with the current configuration so as to generate a new revision of the configuration. Eventually the configuration may be verified on the target system by repeating the script.

It should be noted that as the vehicle ECUs 202, 204 that are connected to external interfaces may also be connected to the in-vehicle network 200, they may act as an attack vector to other ECUs 202, 204. For example, the interface to the internal in-vehicle network 200 may be based on at least one of CAN, Ethernet, Most, and Flexray protocols. In some embodiments, a security system (e.g., security layer 210) may be deployed on those ECUs in order to monitor and/or filter the communication between the vehicle to a server. A security system, unit or module (e.g., security layer 210) may be deployed on those ECUs in order to monitor and/or filter the communication between those ECUs and other ECUs on the in-vehicle network 200.

In some embodiments, a monitoring system may keep track of the communication and look for deviations from the specifications of the system. For example, a monitoring system may look for at least one of: application that is associated with the communication, protocol that is used, the rate of the communication, services (e.g., SOME/IP service IDs) that are used, clients that are associated with the communication (e.g., IP and/or MAC addresses and/or SOME/IP client IDs).

In some embodiments, a monitoring system may detect violations in the communication. Upon such detection, the system may react to the detection. For example, the system may react by blocking the communication, and/or terminating the associated application and/or logging the event. For example, a system may monitor Diagnostics over Internet Protocol (DoIP) communication. The system may limit access to specific diagnostic services based on its security policy. For example, the system may limit access to specific services based on the level of security access of the system and/or based on vehicle state. In some embodiments, the level of security access of the system may be changed by establishing a secure connection with the system, for example using a cryptographic handshake and/or a security token.

Figure 5:
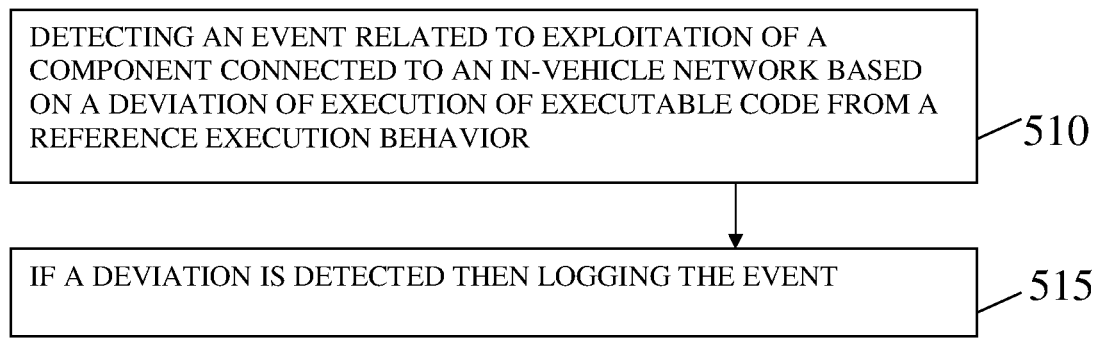
FIG. 5 shows a flowchart of a method of detecting attacks on in-vehicle networks, according to some embodiments of the invention.

Reference is made to FIG. 5, which shows a flowchart of a method of detecting attacks on in-vehicle networks, according to some embodiments of the invention.

A method of detecting exploitation of a component connected to an in-vehicle network may include comparing an execution of executable code to a reference execution and, if the execution does not match the reference execution then determining a component connected to the in-vehicle network is exploited. For example, execution of executable code 220 may be recorder under supervised conditions (e.g., in a lab), e.g., some or even all of the instruction executed, functions or APIs called and each and every access to a resource (e.g., opening a file, accessing a communication port and so on) may be recorded thus producing a reference execution or representation of a reference or known execution. A reference execution may be stored on a persistent storage device (e.g., on storage system 130 operatively connected to security layer 210). For example, a file stored in storage system 130 may include all data collected and/or generated while monitoring a supervised execution of executable code 220 as described, accordingly, content in the file may be, or may be used as, a reference execution. It will be noted that a reference execution in the form of, or stored in, a file may be provided by any unit or system. For example, a reference execution as described may be downloaded to security layer 210, e.g., from server 260. For example, when a new software or firmware version for ECU 202 is provided (e.g., by the manufacturer of ECU 202), a new or updated reference execution may be generated as described and the new or updated reference execution may be downloaded to security layer 210.

At a later stage or time, an execution of executable code 220 may be monitored and compared to the reference execution thus a deviation from an expected, reference execution can be detected. For example, if the reference execution does not include a call to a specific API then, if when executing in a vehicle, executable code 220 calls the specific API (e.g., since executable code 220 has been hacked or modified) a deviation from an expected or reference execution may be detected or identified as described.

As shown by block 510, an event related to exploitation or infiltration of a component connected to an in-vehicle network may be detected based on a deviation of execution of executable code from a reference execution behavior. For example, the deviation may be detected based on a set of whitelists and blacklists used for whitelisting (including in a whitelist) or blacklisting (excluding from a whitelist or including in a blacklist) any applicable entity. For example, a specific API may be included in a whitelist for a specific ECU when the ECU, or vehicle including the ECU, is in a specific state, a specific resource, e.g., storage device, port or a software application or utility may be blacklisted or whitelisted and so on. Blacklisting and whitelisting as described may be applied to one or more of: a process tree, metadata related to a process, access to a resource, call to a function and an instruction in executable code. For example, specific parameter values in metadata related to a process, e.g., permissions, parent-child relations, size in bytes and the like may be blacklisted, e.g., running in kernel mode may be blacklisted. Accessing calling, invoking or executing a specific software function, utility or routine, or accessing a specific communication or external port (a resource) may be blacklisted thus, access to the port or calling the function may be an event related to exploitation of a component connected to an in-vehicle network that is detected and identified as a deviation from a reference deviation of execution of executable code from a reference execution behavior. Accordingly, embodiments of the invention improve the field of cyber-security by providing complete control of execution of code, specifically in embedded systems such as ECUs.

As shown by block 515, if a deviation is detected, an embodiment may log or record the event. A logging of an event may include storing, e.g., on a flash or other storage device (e.g., storage system 130) any data related to the event, e.g., name or identification of, or a reference to, a process, the time the event was detected, the state of the relevant vehicle (e.g., the vehicle including security layer 210) and so on.

Any data collected, calculated or generated, e.g., logs as described, a decision that a deviation was detected, or any data related to detected security threats may be provided to a server remote from the vehicle (e.g., server 260) in which the data is collected and server 260 may generate, based on data received from a plurality of security layers 210 in a fleet of vehicles, present data related to the fleet. Accordingly, embodiments of the invention improve the field of fleet management and fleet security by aggregating data from a fleet and presenting the data in a way that enables a user to see the state of a fleet with respect to security.

A deviation of execution of executable code from a reference execution behavior may be detected using a rule engine that may be included, or executed by, security layer 219 and that may associate chains or sequences of events with a threat. For example, a chain or sequence of events that may be identified as a security threat may be the calling of a set of functions or APIs in a specific sequence or order, or it may be accessing a set of resources (e.g., a communication port, storage device, sound system etc.) in a specific sequence or order. Specific chains of events may be blacklisted and/or whitelisted as described.

As described, embodiments of the invention may include software sensors, e.g., software sensor 240. Software sensors may intercept a system call or an instruction that is about to be executed, e.g., by a controller in an ECU. For example, a software sensor may intercept a system call of a controller in ECU 202 and may detect a security threat based on analyzing data related to the intercepted call or instruction. If the software sensor detects a threat as described, the software sensor may log the threat, e.g., by logging an event as described. Generally, any functionality, operation or logic provided by security layer 210 may be provided or executed by a software sensor. For example, software sensor may block or prevent a call or instruction, e.g., if, using blacklists, heuristics or rules as described, the software sensor determines a threat or anomaly was detected or identified.

Unless explicitly stated, the method embodiments described herein are not constrained to a particular order in time or chronological sequence. Additionally, some of the described method elements may be skipped, or they may be repeated, during a sequence of operations of a method.

Various embodiments have been presented. Each of these embodiments may of course include features from other embodiments presented, and embodiments not specifically described may include various features described herein.

The invention claimed is:

1. A security system comprising:
a security layer embedded in a component connected to an in-vehicle network and adapted to:
detect an occurrence of an event related to exploitation of the component based on a deviation from an expected behavior, wherein a deviation is detected based on identifying the occurrence of an unexpected sequence of events;
wherein the occurrence of an unexpected sequence of events is at least one of:
an execution of a sequence of programs,
a consecutive or repetitive executions of the same program,
a calling of a set of functions or APIs in a specific sequence or order, and
accessing a set of resources in a specific sequence or order; and
if a deviation is detected, then log the event.

2. The system of claim 1, wherein the system is adapted to provide a server with data related to detected security threats and the server is adapted to generate and present data related to a fleet of vehicles.

3. The system of claim 1, wherein the system is adapted to receive events from one or more software sensors.

4. The system of claim 3, wherein at least some of the software sensors are adapted to:
intercept a system call or an instruction to be executed;
detect a security threat based analyzing data related to the intercepted call or instruction; and
log the threat.

5. The system of claim 4, wherein at least some of the software sensors are adapted to block or prevent the call or instruction.

6. The system of claim 1, wherein the system is adapted to:
associate a security policy with at least one application;
digitally sign the security policy; and
verify the security based on a signature.

7. The system of claim 1, wherein the system is adapted to:
detect a security threat;
associate the threat with a confidence level; and
select performing at least one action based on the confidence level.

8. The system of claim 1, wherein the system is adapted to scan a memory to detect a deviation based on a timer or based on an event.

9. The system of claim 1, wherein the system is adapted to perform at least one action selected from the group consisting of: disabling a component connected to the network, killing a process, activating a component connected to the network, blocking a message, delaying a message, limiting a frequency of a message type, logging a message, alerting a user, modifying content in a message, modifying of attributes of content, modifying metadata related to content, changing permissions of executable code, resetting a component, reverting a component to a known state and executing a process.

10. The system of claim 1, wherein the deviation is identified based on a state of the vehicle or based on a state of a component included in the vehicle.

11. A method comprising:
detecting an occurrence of an event related to exploitation of a component, wherein the component is connected to an in-vehicle network, based on a deviation of the system from an expected behavior, wherein the deviation is detected based on identifying the occurrence of an unexpected sequence of events;
wherein the occurrence of an unexpected sequence of events is at least one of:
an execution of a sequence of programs,
a consecutive or repetitive executions of the same program,
a calling of a set of functions or APIs in a specific sequence or order, and
accessing a set of resources in a specific sequence or order; and
if a deviation is detected, then logging the event.

12. The method of claim 11, comprising:
providing a server with data related to detected security threats; and
generating and presenting, by the server, data related to a fleet of vehicles.

13. The method of claim 11, comprising receiving events from one or more software sensors, wherein at least some of the software sensors are adapted block or prevent the call or instruction.

14. The method of claim 13, comprising:
intercepting, by a software sensor, a system call or an instruction to be executed;
detecting, by the software sensor, a security threat based analyzing data related to the intercepted call or instruction; and
logging the threat.

15. The method of claim 11, comprising:
associating a security policy with at least one application;
digitally signing the security policy; and
verifying the security based on a signature.

16. The method of claim 11, comprising:
detecting a security threat;
associating the threat with a confidence level; and
selecting to perform at least one action based on the confidence level.

17. The method of claim 11, comprising scanning a memory to detect a deviation based on a timer or based on an event.

18. The method of claim 11, wherein the deviation is identified based on a state of the vehicle or based on a state of a component included in the vehicle.

19. The system of claim 1, wherein the security layer is adapted to identify an unexpected sequence of events based on at least one of:
a retransmission of network packets,
a repetitive attempt to communicate with a component,
the number of times a resource is accessed in a predefined time interval, and
the number of messages sent over a network to a specific destination.

20. The method of claim 11, wherein identifying an unexpected sequence of events is based on at least one of:
a retransmission of network packets,
a repetitive attempt to communicate with a component, the number of times a resource is accessed in a predefined time interval, and the number of messages sent over a network to a specific destination.

* * * * *